United States Patent
Liu et al.

(10) Patent No.: US 9,749,341 B2
(45) Date of Patent: Aug. 29, 2017

(54) METHOD, DEVICE AND SYSTEM FOR RECOGNIZING NETWORK BEHAVIOR OF PROGRAM

(71) Applicant: BEIJING QIHOO TECHNOLOGY COMPANY LIMITED, Beijing (CN)

(72) Inventors: Haisu Liu, Beijing (CN); Cong Zhang, Beijing (CN); Yuzhi Xiong, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 134 days.

(21) Appl. No.: 14/653,335

(22) PCT Filed: Sep. 17, 2013

(86) PCT No.: PCT/CN2013/083667
§ 371 (c)(1),
(2) Date: Jun. 18, 2015

(87) PCT Pub. No.: WO2014/094470
PCT Pub. Date: Jun. 26, 2014

(65) Prior Publication Data
US 2015/0350232 A1 Dec. 3, 2015

(30) Foreign Application Priority Data
Dec. 18, 2012 (CN) .......................... 2012 1 0551543

(51) Int. Cl.
*H04L 29/06* (2006.01)
*H04L 12/26* (2006.01)
(Continued)

(52) U.S. Cl.
CPC ........ *H04L 63/1425* (2013.01); *G06F 21/554* (2013.01); *H04L 43/04* (2013.01);
(Continued)

(58) Field of Classification Search
CPC .......... G06F 21/60; G06F 12/16; G06F 15/16; G06F 12/14; G06F 15/173
(Continued)

(56) References Cited

U.S. PATENT DOCUMENTS

| 7,769,851 B1 * | 8/2010 | Guruswamy | ......... G06F 15/173 709/224 |
| 7,870,612 B2 * | 1/2011 | Liu | ....................... G06F 21/562 713/188 |
| 2010/0191853 A1 | 7/2010 | Rojas et al. | |

OTHER PUBLICATIONS

Haitao, Z. et al., English abstract only of Chinese application No. CN101272380A, Method, system and device for network action management, publication date Sep. 24, 2008, one page.
(Continued)

*Primary Examiner* — Thanhnga B Truong
(74) *Attorney, Agent, or Firm* — James M. Stipek; John R. Bednarz; Polsinelli PC

(57) ABSTRACT

The present disclosure discloses a method, device and system for recognizing network behavior of a program. The method comprises: during the program's access to a network, acquiring application layer data in a current network behavior of the program; judging whether the application layer data includes an unknown protocol; if protocols in the application layer data are all known protocols, identifying the current network behavior of the program as a network behavior of a recognizable program; and if the application layer data includes an unknown protocol, identifying the current network behavior of the program as a network behavior of a suspicious program. As such, a accurate recognition of a network behavior of a program is realized, the network behavior of the program including an unknown protocol is identified as a network behavior of a suspicious program, risk prompt information can be sent to a user, and a final selection is performed by the user, thereby solving the problem that conventional solutions for recognizing a network behavior of a program cannot accurately recognize a
(Continued)

network behavior of a newly-emerging or new variant program.

17 Claims, 3 Drawing Sheets

(51) Int. Cl.
   *H04W 4/00* (2009.01)
   *G06F 21/55* (2013.01)
   *H04W 12/12* (2009.01)

(52) U.S. Cl.
   CPC ...... *H04L 43/0876* (2013.01); *H04L 63/1433* (2013.01); *H04W 4/00* (2013.01); *H04W 12/12* (2013.01)

(58) Field of Classification Search
   USPC ..... 726/22–26; 713/188; 709/202, 220, 223, 709/224, 248, 250
   See application file for complete search history.

(56) References Cited

OTHER PUBLICATIONS

Qiongying, H. et al., English abstract only of Chinese application No. CN102136956A, Monitoring method and system for detecting network communication behaviors, publication date Jul. 27, 2011, one page.

International Search Report regarding PCT/CN2013/083667, issued Dec. 12, 2013, 2 pages.

Liu, H. et al., English abstract only of Chinese application No. CN103051617A, Method, device and system for identifying network behaviors of program, publication date Apr. 17, 2013, one page.

Liu, H. et al., English abstract only of Chinese application No. CN103067360A, Method and system for procedure network behavior identification, publication date Apr. 24, 2013, one page.

* cited by examiner

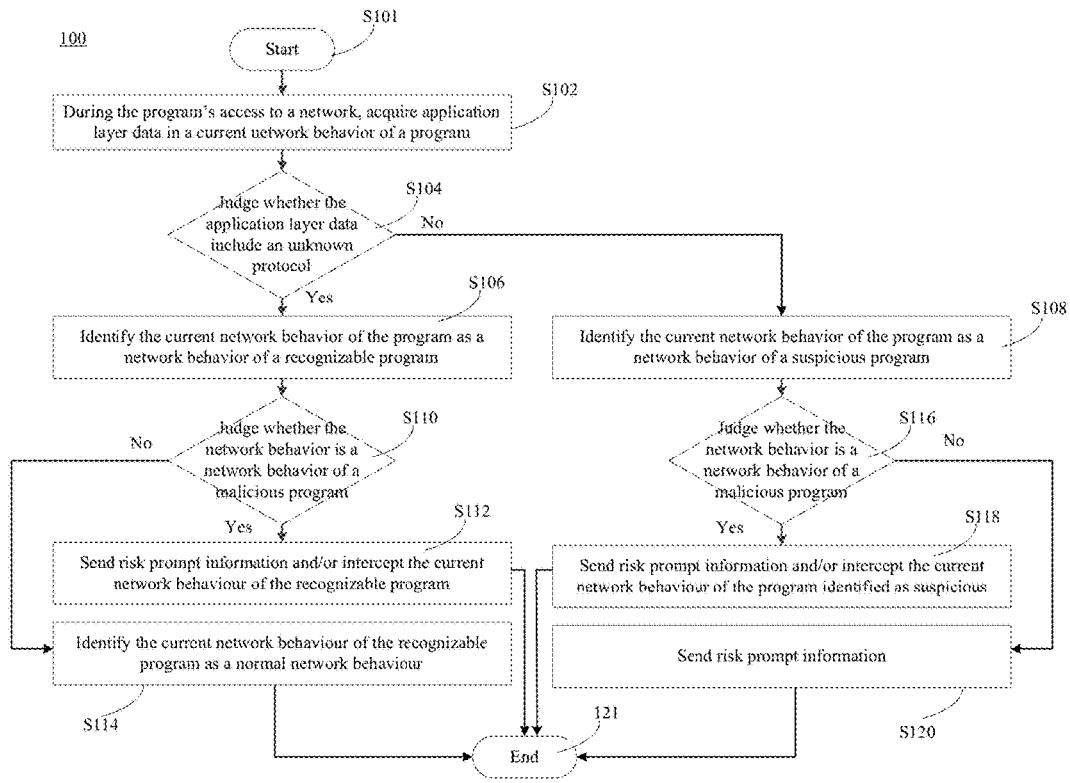
Figrue 1
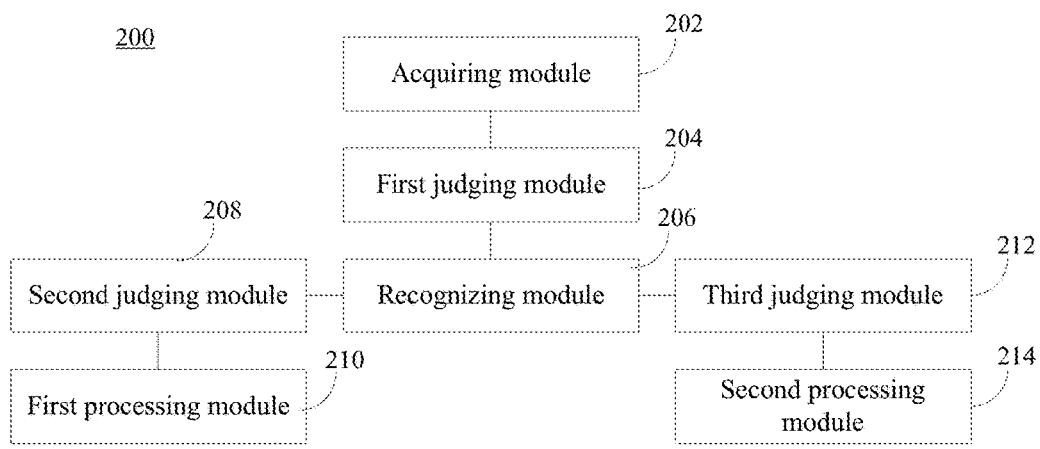
Figure 2

METHOD, DEVICE AND SYSTEM FOR RECOGNIZING NETWORK BEHAVIOR OF PROGRAM

FIELD OF THE INVENTION

The present invention relates to the technical field of computer technology, particularly to a method, device and system for recognizing a network behavior of a program.

BACKGROUND OF THE INVENTION

As well known, the network structure which is most extensively applied in the present-day Internet environment satisfies the DoD model (also called TCP/IP family). The DoD model comprises a link layer, an Internet layer, a transmission layer and an application layer. If a program desires to send or receive Internet data, it needs to make its own data meet the TCP/IP protocol standard so that the data can be accurately and effectively transmitted in the Internet. Among the four-layer protocols, the data structures of the link layer, Internet layer and transmission layer all have a set of relatively rigid standard, a programmer cannot change their structures without authorization, so key data can be easily monitored by security software or security device and is difficult to disguise. Only the data structure of the application layer has a very high customizable characteristic. A programmer is allowed to arbitrarily define content and structure therein according to his own demands and ideas.

The current solution of detecting the data structure of the application layer performs the detection mainly relying on feature codes, i.e., a developer finds a certain network threat (remote control, Trojan, worm or the like) that has already occurred, by performing research and analysis of a sample on hand, grasps network data packets transmitted by it, then extracts its fixed feature (e.g., a specific characteristic occurring at a certain specific offset) as a basis for an automatic detection of the program. However, the biggest drawback of this conventional solution lies in the existence of hysteresis, and a sample of a new threat must be found and analyzed, only then an effective interception can be done.

As known from the above, the conventional manner for recognizing the network behavior of the program cannot accurately recognize a newly-emerging or new variant network behavior of the program.

SUMMARY OF THE INVENTION

In view of the above problem, the present invention is proposed to provide a method, device and system for recognizing a network behavior of a program to overcome the above technical problem or at least partially solve the above technical problem.

According to an aspect of an embodiment of the present invention, there is provided a method for recognizing a network behavior of a program, the method comprising: during the program's access to a network, acquiring application layer data in a current network behavior of the program; judging whether the application layer data includes an unknown protocol; if protocols in the application layer data are all known protocols, identifying the current network behavior of the program as a network behavior of a recognizable program; and if the application layer data includes an unknown protocol, identifying the current network behavior of the program as a network behavior of a suspicious program.

According to another aspect of an embodiment of the present invention, there is provided a device for recognizing a network behavior of a program, the device comprising: an acquiring module configured to acquire application layer data in a current network behavior of the program during the program's access to a network; a first judging module configured to judge whether the application layer data include an unknown protocol; a recognizing module configured to identify the current network behavior of the program as a network behavior of a recognizable program when protocols in the application layer data are all known protocols; and identify the current network behavior of the program as a network behavior of a suspicious program if the application layer data includes an unknown protocol.

According to a further aspect of an embodiment of the present invention, there is provided a system for recognizing a network behavior of a program, the system comprising: a client and a cloud server, wherein the client is configured to, during the program's access to a network, acquire application layer data in a current network behavior of a program; judge whether the application layer data includes an unknown protocol; identify the current network behavior of the program as a network behavior of a recognizable program if protocols in the application layer data are all known protocols; and if the application layer data includes an unknown protocol, identify the current network behavior of the program as a network behavior of a suspicious program, and then send feature information of the network behavior of the recognizable program or the network behavior of the suspicious program to the cloud server; the cloud server is configured to judge whether the network behavior of the recognizable program or the network behavior of the suspicious program is a network behavior of a malicious program according to the feature information, and return a judgment result to the client.

According to a further aspect of an embodiment of the present invention, there is provided a system for recognizing a network behavior of a program, the system comprising: a client and a cloud server, wherein the client is configured to, during the program's access to a network, acquire a data packet on a current network behavior of the program, the data packet comprises application layer data, and receive a recognition result returned by the cloud server; the cloud server is configured to receive the data packet in the current network behavior of the program acquired by the client, and judge whether the application layer data includes an unknown protocol; identify the current network behavior of the program as a network behavior of a recognizable program if protocols in the application layer data are all known protocols; and if the application layer data includes an unknown protocol, identify the current network behavior of the program as a network behavior of a suspicious program, and send a recognition result to the client.

According to the method, device and system for recognizing a network behavior of a program according to an embodiment of the present invention, the current network behavior of the program is identified as a network behavior of a recognizable program if the protocols in the application layer data in the current network behavior of the program are all known protocols; and if the application layer data in the current network behavior of the program includes an unknown protocols, the current network behavior of the program is identified as a network behavior of a suspicious program, thereby achieving an accurate recognition of the network behavior of the program. The network behavior of the program including an unknown protocol is identified as the network behavior of a suspicious program, and risk prompt information can be sent to a user, and the final selection is performed by the user, thereby solving the problem that a conventional solution for recognizing a network behavior of a program cannot accurately recognize the network behavior of a newly-emerging or new variant program, and further solving the problem that the conventional solution for recognizing a network behavior of a program does not intercept unknown network protocols, thus improving the user's network security.

Furthermore, after the current network behavior of the program is identified as a network behavior of a recognizable program, or the current network behavior of the program is identified as a network behavior of a suspicious program, the client can send feature information in the application layer data to the cloud server, and the cloud server judges whether the network behavior of the program is a network behavior of a malicious program according to blacklists and whitelists in a blacklist and whitelist library. By storing blacklists and whitelists that have a larger amount of data and change relatively frequently on the cloud server, and let the cloud server recognizes the network behavior of the malicious program, the client's local resources can be effectively saved and the performance overhead of the client's local machine can be effectively reduced, and meanwhile the response speed for recognizing the network behavior is also quickened. The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures:

FIG. 1 shows a flow chart of a method 100 for recognizing a network behavior of a program according to an embodiment of the present invention;

FIG. 2 shows a structural block diagram of a device 200 for recognizing a network behavior of a program according to another embodiment of the present invention;

DETAILED DESCRIPTION OF THE INVENTION

Figure 3:
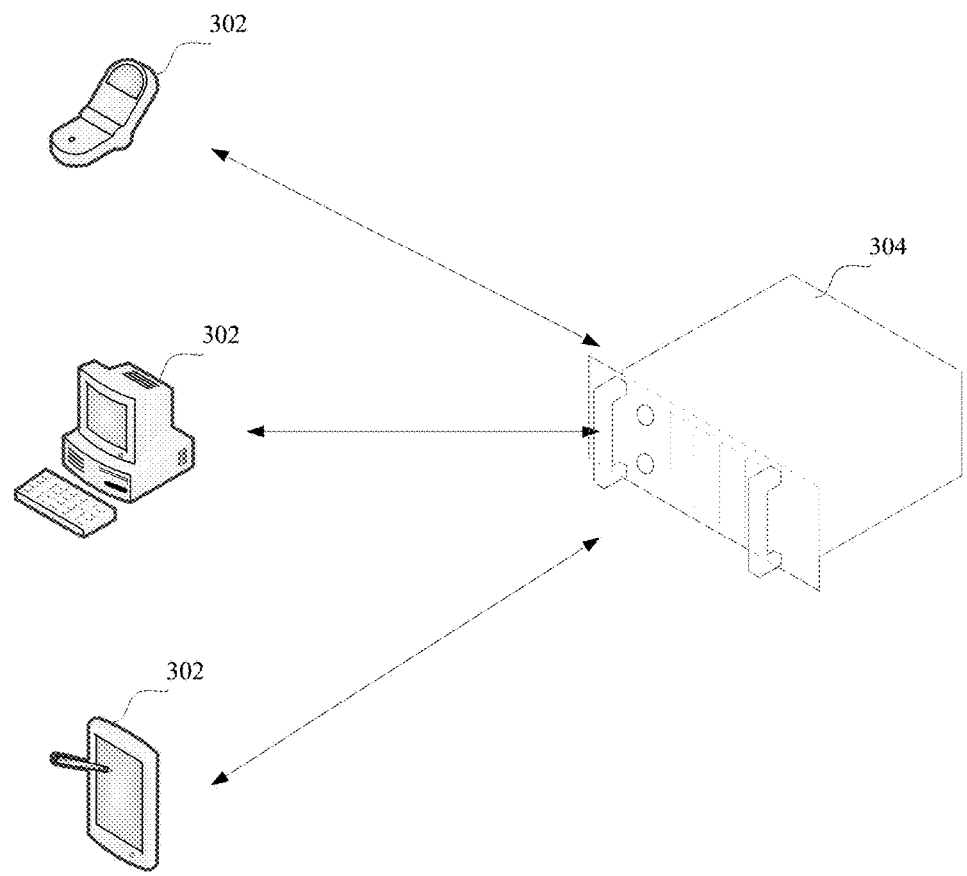
FIG. 3 shows a structural block diagram of a system 300 for recognizing a network behavior of a program according to a further embodiment of the present invention.
Figure 4:
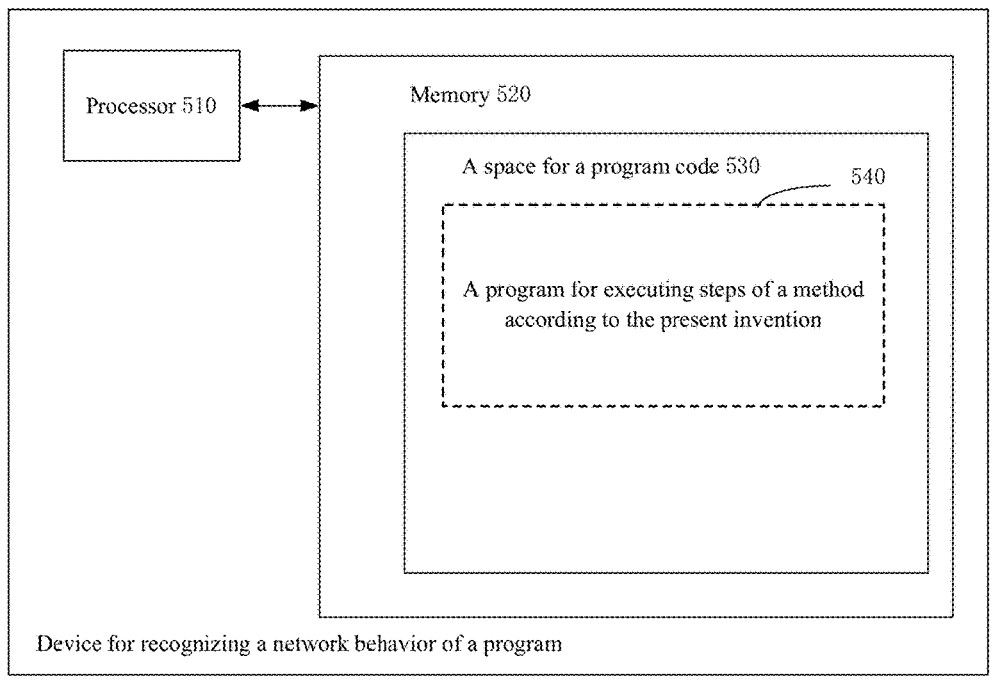
FIG. 4 schematically shows a block diagram of a server for executing the method according to the present invention.

Exemplary embodiments of the present disclosure will be described in more detail with reference to the figures. Although the figures show the exemplary embodiments of the present disclosure, it should be appreciated that the present disclosure may be implemented in various forms and should be not limited by the embodiment described here. On the contrary, these embodiments are provided to make the present disclosure more apparent and entirely convey the scope of the present disclosure to those skilled in the art.

Conventional solutions of recognizing a network behavior of a program mostly begin with known data, i.e., attempting to find which portions of the data are already known, and then find useful portions from these known data to judge whether the data are threatening. However, a drawback of this idea lies in that once application layer data of network data are unknown, very little valid and known data can be obtained, and as such, it is very difficult to perform a precise judgment as to whether the network is confronted with a threat, and it is very easy to let an unknown network behavior which is threatening to the network slip.

To this end, embodiments of the present invention provides a method, device and system for recognizing a network behavior of a program, and its idea is based on the fact that the data structure of the application layer in the TCP/IP protocol system has a higher customizable characteristic. Once a self-defined data structure is detected in the application layer data, it may be believed that the current network behavior has a risk. Therefore, the method for recognizing a network behavior of a program proposed by the present invention mainly lies in judging whether the application layer data of the current network behavior of the program includes an unknown protocol; if protocols in the application layer data are all known protocols, identifying the current network behavior of the program as a network behavior of a recognizable program; and if the application layer data includes an unknown protocol, identifying the current network behavior of the program as a network behavior of a suspicious program.

Hereinafter, reference is made to FIG. 1 to specifically describe a flow chart of a method 100 for recognizing a network behavior of a program according to an embodiment of the present invention, which is adapted to solve the above technical problem. As shown in FIG. 1, the method 100 according to the embodiment of the present invention begins with step S101. Then at step S102, application layer data of the current network behavior of the program is acquired during the program's access to the network.

It should be noted that, a program is an ordinary file, a set of machine code instructions and data, and a static concept. A process is a procedure that the program is executed on a computer one time, and a dynamic concept. The same program may be simultaneously run on several data sets, i.e., the same program may correspond to a plurality of processes. An network behavior is initiated by the program that is running (namely, the process). The current network behavior of the program is the network behavior initiated by the process belonging to the program.

To facilitate the understanding of the step, the network behavior is briefly introduced first. Network behaviors can be understood as various behaviors that need to be performed through the network, and network behaviors have diverse kinds, e.g., including HTTP (Hypertext Transport Protocol) access (downloading a file or uploading information as commonly seen), SMTP (Simple Mail Transfer Protocol) request (receiving or sending an electronic mail), DNS (Domain Name System) request (parsing information such as an IP address corresponding to a domain name and etc.) and the like.

Secondly, an introduction is made to a procedure of an application program accessing a network: usually if a program needs to connect to the network, it needs to send a network connection request via an API (Application Program Interface) provided by an operating system (e.g., Windows), the operating system, after receiving such network request of the application program, will receive data to be sent by the application program, and package the received data, then send the packaged data to a physical device (e.g., a network card), and finally the hardware device transmits data out.

Based on the above procedure of the application program accessing the network, intercepting information of the network behavior at any link of the procedure may achieve the purpose of monitoring the current network behavior of the program. Specific modes of implementing the monitoring may include but not be limited to the following manners: intercepting information of the current network behavior by registering a protocol driver at a client, creating a filter driver similar to the operating system and using an application programming interface function (e.g., hook function) provided by the operating system, or intercepting information of the current network behavior of the program by taking over the program's request to invoke a network programming interface function (Winsock) or using registered firewall callback. Detailed description will be presented below:

During the access of the application program to the network, the operating system, upon handling relevant data, will use some protocol drivers and filter drivers to acquire data of the network behavior, so a protocol driver may be registered or a filter driver similar to the filter driver used by the operating system may be created to acquire the data of the network behavior. A specific implementation mode may be as follows: registering the protocol driver to the NDIS (Network Driver Interface Specification), or adding the filter driver similar to the operating system on an Afd.sys (Ancillary Function Driver for Winsock) driving device stack, on a Tdi.sys (Transport Dispatch Interface) driving device stack or on a Tcpip.sys (Transmission Control Protocol/Internet Protocol) driving device stack.

In addition, acquiring the application layer data in the current network behavior of the program may also be implemented in the following manner: intercepting data of the network behavior by using a hook function. A specific implementation mode may be as follows: using the hook function to intercept a device communication interface NtDeviceIoControl function provided by an inner core in a Windows SSDT (System Services Descriptor Table), acquiring data of all application program device communication, and filtering the request sent to the Afd.sys therein; or using the hook function to intercept a service function provided by the Tcpip.sys driver or an interface introduced by the NDIS.sys, the network behavior of the program is monitored through the above modes. Certainly, the network behavior of the program may also be monitored in the following manner: expanding the LSP mechanism according to the LSP (Layered Service Provider) of Windows, using its own DLL file to take over all requests that the application program invokes Winsock, and then forwarding to mswsock.dll of Windows itself, or sending a IOCTL_IP_SET_FIREWALL_HOOK registered firewall callback to an IP device driver of the Windows system. In practice, the above different manners may be selected according to actual situations upon monitoring the network behavior of the program, and certainly the manners of monitoring the network behavior are not limited to those listed above.

Then, in step S104, whether the application layer data include an unknown protocol is judged. In some embodiments, whether the application layer data include an unknown protocol is judged according to formats of known protocols. For example, known protocols at least comprise at least one of the following: HTTP protocol, DNS protocol, SMTP protocol, FTP protocol (File Transfer Protocol), SNMP protocol (Simple Network Management Protocol) and POP3 protocol (the third vision of post office protocol).

Optionally, a sufficient number of known protocols are pre-collected in a client, which comprises three types of protocols: HTTP protocol, DNS protocol and SMTP protocol, and some encryption protocols may be further comprised, such as the FTP protocol. An encryption protocol mainly performs packaging for unknown protocols in the data packet in a uniform encryption format, some recognizable commonly-used protocols are added to the data packet, and these commonly-used protocols may comprise SNMP protocol, POP3 protocol, eMule/eDonkey protocol, BITTORRENT protocol or the like. As different protocols have their own fixed formats, to detect the known protocols, it can be done by detect the formats of the known protocols, for example, the HTTP protocol comprises a protocol head and does not comprise a protocol tail, fields such as Host and Refer all belong to the content included in the protocol head, the common format of the protocol head comprises field portions such as Host, Refer, User-agent and Url.

If the application layer data comprise an unknown protocol, it can be assumed that a risk exists. Although the application layer data can be designated arbitrarily by a software developer, a set of universal protocol (also called known protocols) standards have already been formed during actual application to facilitate data communication in the Internet. The known protocols are for example DNS protocol, HTTP protocol, FTP protocol, SMTP protocol, SSL/TLS protocol, SSH protocol, uTorrent protocol, eMule/eDonkey protocol, BitTorrent protocol and the like. The foregoing known protocols have occupied a majority of network data. So as long as the data structures of the aforesaid known protocols can be effectively identified and analyzed, the remaining unknown protocols will be in extremely little number. Since known protocols can basically meet the needs of all data transmissions, it is reasonable to believe that where a self-defined protocol (namely, unknown protocol) is needed for data transmission, it should be used in a specific environment in an extremely small scope to meet a certain special need, and should not be extensively spread in the Internet. Therefore, the application layer data including an unknown protocol is classified as suspicious, and it is necessary to provide risk prompt for the user.

Specifically in the flow of the method 100, formats of known protocols can be pre-collected, and the known protocols include but not limited to DNS protocol, HTTP protocol, FTP protocol, SMTP protocol, SSL/TLS protocol, SSH protocol, uTorrent protocol, eMule/eDonkey protocol, and BitTorrent protocol. Then in step S104, the protocols in the application layer data are recognized according to the formats of the pre-collected known protocols, if the protocols in the application layer data all can be recognized, all the protocols in the application layer data are judged as known protocols; if at least a part of protocols in the application layer data cannot be recognized, the application layer data are judged as comprising an unknown protocol.

If all the protocols in the application layer data are judged as known protocols in step S104, step S106 will be performed. In step S106, the current network behavior of the program is identified as a network behavior of a recognizable program.

That is to say, when the protocols in the application layer data of the network behavior all are known protocols, this means that the network behavior can be recognized, whereupon in step S106 that network behavior is identified as a network behavior of the recognizable program. For example, the network behavior is identified as a network behavior of a recognizable program by using an identifier "1". Certainly, it can be appreciated that embodiments of the present invention do not limit specific forms of identifiers.

After step S106, the flow proceeds to the finishing step S121. However, in order to further judge whether the network behavior of the recognizable program is a network behavior of a malicious program, the flow can proceed to step S110 after step S106, and in step S110, whether the network behavior of the recognizable program is a network behavior of a malicious program can be recognized.

A malicious program usually refers to a section of program programmed by an operator with an attack intention. These threats can be classified into two classes: threats needing a host program and mutually independent threats. The former substantially cannot be independent from a certain practical application program, utility program or program segment of a system program; the latter are self-inclusive programs that can be scheduled and run by an operating system. The malicious programs include trap door, logic bomb, Trojan horse, worm, bacteria, virus and etc.

In some embodiments, whether the network behavior of the recognizable program is a network behavior of a malicious program can be recognized in the following two manners:

Manner 1: a module is preset on a client to store a blacklist and a whitelist in a blacklist and whitelist library, and the client can judge whether the network behavior is a network behavior of a malicious program according to the blacklist and whitelist and the acquired feature information.

Optionally, network defense-related blacklist and whitelist can perform different check items with respect to different protocols. For example, (1) universal check items, comprising checking a remote IP address, local port, remote port, transport layer protocol (usually one of TCP and UDP). (2) protocol type check: some known protocols might be remotely used by a Trojan horse for data transmission, and once such type of protocols are found, they can be judged as data protocol packets used by the malicious program. (3) protocol detail check: regarding other known protocols, objects of themselves that have reference value and do not involve detection are acquired according to specific structures of the protocols, and regarded as a criteria for judging for black or white. Specific items of the protocol detail may vary with the difference of protocols, e.g., encrypted fields such as URL, Host, Referer, User-Agent in the HTTP protocol are detected on the client; encrypted fields such as Name and Type in Queries information in DNS protocol are detected.

Specifically, the client acquires feature information in the application layer data of the network behavior of the recognizable program, the feature information may be partial codes in the application layer data, a data packet in the application layer data, or a segment of data in the data packet in the application layer data; whether the network behavior of the recognizable program is a network behavior of a malicious program is judged according to the blacklist and whitelist on the client and the acquired feature information.

An introduction is made by taking HTTP access as the network behavior. Specifically, among the above steps, the application layer data of the HTTP access behavior are acquired in step S102. In step S104, it is judged that protocols included by the HTTP access behavior are all known protocols according to the format of the HTTP protocol. Then in step S106, the HTTP access behavior is identified as a network behavior of a recognizable program. Then in step S110, feature information in the application layer data of the HTTP access behavior is acquired, such as Host field, Url field, IP address field and etc., and whether the above feature information belongs to feature information in a network behavior of a malicious program is judged according to the blacklist and whitelist in the blacklist and whitelist library, if it belongs to the feature information in the network behavior of the malicious program, the network behavior belongs to the network behavior of the malicious program, and the flow proceeds to step S112; if it does not belong to the feature information in the network behavior of the malicious program, the network behavior belongs to the normal network behavior, and the flow proceeds to step S114.

Noticeably, the items checked in manner 1 vary with different protocols, for example, regarding the DNS protocol, the check is mainly performed with respect to domain name parsing of a request packet, judgment of a character string of the parsed domain name, and whether the IP address returned by DNS is abnormal. Regarding the SMTP protocol, whether the name field portion is abnormal is mainly judged, e.g., checking whether a mail sender, a receiver, and the sender's name and domain name, and the receiver's name and domain name are abnormal. Regarding the FTP protocol and HTTP protocol, whether the domain name and the Url field are abnormal are judged. If the above fields match a blacklist in a cloud server or client, the protocol will be believed as having a risk, and it is necessary to provide a risk prompt to the user. All data obtained in the SMTP protocol can be processed with a hash value such as MD5 and then uploaded to a cloud server, and the blacklist and whitelist only detects the MD5 value of the data in the SMTP protocol and do not involve the mail content itself.

Manner 2: a database is preset on a cloud server, the database is used to store the blacklist and whitelist in the blacklist and whitelist library, the client sends the acquired feature information to the cloud server, and the cloud server judges whether the network behavior belongs to a network behavior of a malicious program according to the blacklist and whitelist and the received feature information.

Specifically, firstly, the client acquires feature information in the application layer data in the network behavior of the recognizable program, the feature information may be partial codes (e.g., Host field or Url field) in the application layer data, a data packet in the application layer data, or a segment of data in the data packet in the application layer data. Usually, the application layer data also include some self-defined data besides fields for transmission. For example, when the user uses the HTTP or FTP to upload a file to the network or server, besides using fields such as the URL and Host to designate some necessary identification information uploaded by the user, the file itself uploaded by the user can be regarded as a data packet and added into the HTTP or FTP to be transmitted to the designated server. At this time, the content of the file uploaded by the user belongs to the data packet in the application layer protocol (certainly, if the file is large, it might be divided into a plurality of data packets for transmission). This is only a relatively common example, and such data packet will take different forms with respect to different protocols and different application occasions. Certainly, such data packet might not exist or such data packet is empty in certain cases.

Then, the client sends the feature information to the cloud server, the cloud server judges whether the above feature information belongs to feature information in the network behavior of the malicious program according to the blacklist and whitelist in the blacklist and whitelist library, and returns a judgment result to the client. If the feature information belongs to the feature information in the network behavior of the malicious program, the network behavior belongs to the network behavior of the malicious program, and the flow proceeds to step S112; if it does not belong to the feature information in the network behavior of the malicious program, the network behavior belongs to a normal network behavior, and the flow proceeds to step S114. As the storage space of the cloud server is much larger than the client's, the cloud server can pre-store blacklist and whitelist libraries as much as possible, thereby improve accuracy of the identification of the network behavior. Meanwhile, updating may be performed in time on the cloud server for the most recently-collected blacklist and whitelist library.

Back to the flow of the above method 100, if the judgment shows a network behavior of a malicious program in step S110, the flow proceeds to step S112. In step S112, risk prompt information is sent and/or the current network behavior of the recognizable program is intercepted, and then the flow enters the finishing step S121. For example, if it can be determined that the current network behavior of the program is a network behavior of a malicious program, network connection of the program can be paused, the prompt information is sent to the user to notify the user that the program is abnormal, the user makes a final selection, the network behavior will be blocked thoroughly if the user selects to intercept. On the contrary, if the judgment in step S110 does not show a network behavior of a malicious program, the flow will proceed to step S114 to identify the current network behavior of the recognizable program as a normal network behavior, and then the flow enters the finishing step S121. The normal network behavior does not have a risk or has an extremely low risk, and the normal network behavior is allowed to access the network.

Conversely, if it is judged that the application layer data include an unknown protocol in step S104, the flow will proceed to step S108. In step 108, the current network behavior of the program is identified as a network behavior of a suspicious program. That is to say, the protocols of the application layer data of the network behavior of the program are compared with universal protocols, when the application layer data of the network behavior of the program include an unknown protocol, it is decided that the network behavior of the program temporarily cannot be accurately identified and it is decided that the network behavior has a risk, at this time, the network behavior of the program can be identified as a network behavior of a suspicious program. For example, the network behavior is identified as a network behavior of a suspicious program by using an identifier "0". Certainly, it can be understood that embodiments of the present invention do not limit specific forms of identifiers.

After step S108, the flow may proceed to the finishing step S121. However, in order to further judge whether the network behavior of the suspicious program is a network behavior of a malicious program, the flow may enter the step S116 after step S108. In step S116, whether the network behavior of the suspicious program is a network behavior of a malicious program is judged.

A malicious program usually refers to a section of program programmed with an attack intention. These threats can be classified into two classes: threats needing a host program and mutually independent threats. The former substantially cannot be independent from a certain practical application program, utility program or program segment of a system program; the latter are self-inclusive programs that can be scheduled and run by an operating system. The malicious programs include trap door, logic bomb, Trojan horse, worm, bacteria, virus and etc.

In some embodiments, whether the network behavior of the suspicious program is a network behavior of a malicious program can be judged in the following two manners:

Manner 1: a module is preset on a client to store a blacklist and a whitelist in a blacklist and whitelist library, and the client can judge whether the network behavior is a network behavior of a malicious program according to the blacklist and whitelist and the acquired feature information.

Specifically, the client acquires feature information in the application layer data of the network behavior of the suspicious program, the feature information may be partial codes in the application layer data, a data packet in the application layer data, or a segment of data in the data packet in the application layer data. Whether the network behavior of the suspicious program is a network behavior of a malicious program is judged according to the blacklist and whitelist on the client and the acquired feature information. If yes, the network behavior belongs to the network behavior of the malicious program and the flow proceeds to step S118; if no, the network behavior belongs to a network behavior having a risk, and the flow will proceed to step S120.

Noticeably, the items checked vary with different protocols, for example, regarding the DNS protocol, the check is mainly performed with respect to domain parsing of a request packet, judgment of a character string of the parsed domain, and whether the IP address returned by DNS is abnormal. Regarding the SMTP protocol, whether the name field portion, including a mail sender is mainly judged, such as whether a receiver, the sender's name and domain and the receiver's name and domain name are abnormal. Regarding the HTTP protocol, whether fields such as Host, URL, User-Agent, Referer and Method are abnormal are mainly judged. The judgment about abnormity is mainly classified into two classes: (1) precise matching: for example, a Trojan horse is found, the Trojan horse is found connected with a certain IP address or URL, and the IP address or URL is not found as having other proper use, and when a program is found connected with the IP address or URL, the program is believed as being abnormal (there may be a more complicated judgment standard, e.g., the program is believed to being abnormal if it is connected with a specific port of a certain specific IP); (2) fuzzy matching: through long-term monitoring and analysis of the application program of the server end, a large number of Trojan horses are found point to the same IP segment or the same top level domain, and rare or none normal websites have occurred on this IP segment or top level domain, then it can be believed that programs connected to the IP segment or top level domain are all abnormal. In this case, there may be a more complicated judgment standard, for example, in an example of using game456 to perform a Trojan horse propagation, an official domain of game456 is game456.com and game456.net. Many domains connected by the Trojan horse are very close to the official domain, such as game456.me, game456.3322.org, game456.com.abcd.org and etc. Then, it can be believed that all these domains which are similar to the official domain of game456 and very deceptive are all abnormal.

Manner 2: a module is preset on a cloud server to store the blacklist and whitelist in a blacklist and whitelist library, the client sends the acquired feature information to the cloud server, and the cloud server judges whether the network behavior belongs to a network behavior of a malicious program according to the blacklist and whitelist and the received feature information. The feature information uploaded by the client to the cloud server can be subjected to encryption treatment, for example, the MD5 algorithm is used to calculate hash values of all URL, host URL, domain name URL, level domain name URL and query path URL, then the MD5 hash values are sent to the cloud server, the cloud server returns encrypted data along with the MD5 hash values to the client, and the encrypted data include the MD5 hash values.

Specifically, the client acquires feature information in the application layer data in the network behavior of the suspicious program, the feature information may be partial codes (e.g., Host field or Url field) in the application layer data, a data packet in the application layer data, or a segment of data in the data packet in the application layer data. The client sends the feature information to the cloud server, the cloud server judges whether the above feature information belongs to feature information in the network behavior of the malicious program according to the blacklist and whitelist in the blacklist and whitelist library, and returns a judgment result to the client. If yes, the network behavior belongs to the network behavior of the malicious program and the flow proceeds to step S118; if no, the network behavior is a network behavior having a risk, and the flow will proceed to step S120.

As the storage space of the cloud server is much larger than the client's, the cloud server can pre-store blacklist and whitelist libraries as much as possible, thereby improve accuracy of the identification of the network behavior. Meanwhile, processing may be performed in time for the most recently-collected blacklist and whitelist library. In some embodiments, in order to save the client's local resources and reduce the client's performance overhead, and meanwhile improve the response speed, blacklists and whitelists having a larger amount of data and changing relatively frequently can be stored in the cloud server, whereas blacklists and whitelists which are relatively fixed, have a very precise hitting accuracy and have a very little amount of data can be stored on client.

If judgment shows a network behavior of a malicious program in step S116, the flow proceeds to step S118. In step S118, risk prompt information is sent and/or the current network behavior of the suspicious program is intercepted, and then the flow enters the finishing step S121. For example, if it can be determined that the current network behavior of the program is a network behavior of a malicious program, network connection of the program can be paused, the prompt information is sent to the user to notify the user that the program is abnormal, the user makes a final selection, the network behavior will be blocked thoroughly if the user selects to intercept.

On the contrary, if the judgment in step S116 does not show a network behavior of a malicious program, the flow will proceed to step S120. In step S120, the risk prompt information is sent, and then the flow enters the finishing step S121. That is to say, although the network behavior of the suspicious program is not the network behavior of the malicious program, the network behavior of the suspicious program has a risk. Therefore, the risk prompt information is sent to the user through step S120, and the user makes a final selection.

Noticeably, the method shown in FIG. 1 is not necessarily performed in the order of steps as shown, and the sequential order of steps can be adjusted according to needs. Besides, the steps are not limited to the above step division. The above steps can be further divided into more steps or combined into fewer steps.

Hereinafter, reference is made to FIG. 2 to describe a device 200 for recognizing a network behavior of a program according to another embodiment of the present invention, which is adapted to solve the above technical problem.

As shown in FIG. 2, the device 200 for recognizing a network behavior of a program comprises: an acquiring module 202, a first judging module 204 and a recognizing module 206, wherein the acquiring module 202 is configured to acquire application layer data in a current network behavior of a program; the first judging module 204 is configured to judge whether the application layer data include an unknown protocol; the recognizing module 206 is configured to identify the current network behavior of the program as a network behavior of a recognizable program when the protocols in the application layer data are all known protocols; and identify the current network behavior of the program as a network behavior of a suspicious program if the application layer data includes an unknown protocol.

In some embodiments, the first judging module 202 is further configured to judge whether the application layer data include an unknown protocol according to formats of the known protocols. For example, a sufficient number of known protocols are pre-collected on a client and comprise three types of protocols: HTTP protocol, DNS protocol and SMTP protocol, and may comprise some encryption protocols such as FTP protocol. An encryption protocol mainly performs packaging for unknown protocols in the data packet in a uniform encryption format, some recognizable commonly-used protocols are added to the data packet, and these commonly-used protocols may comprise SNMP protocol, POP3 protocol, eDonkey protocol, BITTORRENT protocol or the like. As different protocols have their own fixed formats, the known protocols can be detected by detecting their own formats, for example, the HTTP protocol detects a protocol head and a protocol tail, and field portions such as Host and Refer. The HTTP protocol comprises a protocol head and does not comprise a protocol tail; fields such as Host and Refer all belong to the content included in the protocol head; common format of the protocol head comprises field portions such as Host, Refer, User-agent and Url. The unknown protocols are believed as having a risk. If protocols are unknown protocols, they are not in a scope included by recognizable protocols, and self-defined protocols might be included therein.

Referring to FIG. 2, in another embodiment of the present invention, the device 200 further comprises: a second judging module 208 and a first processing module 210, wherein the second judging module 208 is configured to judge whether the network behavior of the recognizable program is a network behavior of a malicious program; the first processing module 210 is configured to send risk prompt information and/or intercept the current network behavior of the recognizable program when the second judging module 208 judges that the current network behavior of the recognizable program is a network behavior of a malicious program; identify the current network behavior of the recognizable program as a normal network behavior when the second judging module 208 judges that the current network behavior of the recognizable program is not a network behavior of a malicious program.

In some embodiments, the second judging module 208 comprises: a first acquiring unit and a first judging unit, wherein the first acquiring unit is configured to acquire feature information in the application layer data of the network behavior of the recognizable program, the feature information may be partial codes in the application layer data, a data packet in the application layer data, or a segment of data in the data packet in the application layer data; the first judging unit is configured to judge whether the network behavior of the recognizable program is a network behavior of a malicious program according to the feature information.

In some embodiments, the second judging module 208 comprises: a second acquiring unit, a first sending unit and a first receiving unit, wherein the second acquiring unit is configured to acquire feature information in the application layer data in the network behavior of the recognizable program, the feature information may be partial codes in the application layer data, a data packet in the application layer data, or a segment of data in the data packet in the application layer data; the first sending unit is configured to send the feature information to a cloud server, whether the network behavior of the recognizable program belongs to a network behavior of a malicious program is judged by the cloud server according to the feature information; and the first receiving unit is configured to receive a judgment result returned by the cloud server.

Further referring to FIG. 2, the device 200 further comprises: a third judging module 212 and a second processing module 214, wherein the third judging module 212 is configured to judge whether the network behavior of a program identified as suspicious is a network behavior of a malicious program; the second processing module 214 is configured to send risk prompt information and/or intercept the current network behavior of the program identified as suspicious when the third judging module 212 judges that the network behavior of the suspicious program is a network behavior of a malicious program; send risk prompt information when the third judging module 212 judges that the network behavior of the suspicious program is not a network behavior of a malicious program.

In some embodiments, the third judging module 212 comprises: a third acquiring unit and a second judging unit, wherein the third acquiring unit is configured to acquire feature information in the application layer data of the network behavior of the recognizable program, the feature information may be partial codes in the application layer data, a data packet in the application layer data, or a segment of data in the data packet in the application layer data; the second judging unit is configured to judge whether the network behavior of the recognizable program is a network behavior of a malicious program according to the feature information.

In some embodiments, the third judging module 212 comprises: a fourth acquiring unit, a second sending unit and a second receiving unit, wherein the fourth acquiring unit is configured to acquire feature information in the application layer data of the network behavior of the program identified as suspicious, the feature information may be partial codes in the application layer data, a data packet in the application layer data, or a segment of data in the data packet in the application layer data; the second sending unit is configured to send the feature information to a cloud server, whether the network behavior of the suspicious program is a network behavior of a malicious program is judged by the cloud server according to the feature information; and the second receiving unit is configured to receive a judgment result returned by the cloud server.

Hereinafter, reference is made to FIG. 3 to describe a system 300 for recognizing a network behavior of a program according to a further embodiment of the present invention, which is adapted to solve the above technical problem.

As shown in FIG. 3, the system 300 for recognizing a network behavior of a program according to one aspect of an embodiment of the present invention, the system comprises a client 302 and a cloud server 304, wherein The client 302 is configured to, during the program's access to a network, acquire application layer data in a current network behavior of a program; judge whether the application layer data includes an unknown protocol; identify the current network behavior of the program as a network behavior of a recognizable program if protocols in the application layer data are all known protocols; and if the application layer data includes an unknown protocol, identify the current network behavior of the program as a network behavior of a suspicious program, and then send feature information of the network behavior of the recognizable program or the network behavior of the suspicious program to the cloud server; optionally, the client may be a mobile phone, a flat panel computer or a personal computer or the like.

The cloud server 304 is configured to judge whether the network behavior of the recognizable program or the network behavior of the suspicious program is a network behavior of a malicious program according to the feature information, and return a judgment result to the client.

In some embodiments, the cloud server 304 comprises a database for storing a blacklist and whitelist library, and the cloud server judges whether the network behavior of the recognizable program or the network behavior of the suspicious program is a network behavior of a malicious program according to the blacklist and whitelist in the blacklist and whitelist library.

As shown in FIG. 3, the system 300 for recognizing a network behavior of a program according to another aspect of an embodiment of the present invention, the system comprises a client 302 and a cloud server 304, wherein the client 302 is configured to, during the program's access to a network, acquire a data packet in the current network behavior of the program, and the data packet comprises application layer data, and receive a recognition result returned by a cloud server 304;

The cloud server 304 is configured to receive the data packet of the current network behavior of the program acquired by the client 302, and judge whether the application layer data includes an unknown protocol; identify the current network behavior of the program as a network behavior of a recognizable program if protocols in the application layer data are all known protocols; and if the application layer data includes an unknown protocol, identify the current network behavior of the program as a network behavior of a suspicious program, and send a recognition result to the client.

In some embodiments, the cloud server 304 may further acquire feature information of the network behavior of the recognizable program or the network behavior of the suspicious program, judge whether the network behavior of the recognizable program or the network behavior of the suspicious program is a network behavior of a malicious program according to the feature information, and return a judgment result to the client 304. The feature information may be partial codes in the application layer data, a data packet in the application layer data, or a segment of data in the data packet in the application layer data.

In some embodiments, the client 302 may further comprise a memory (which may comprise one or more computer readable storage media), a memory controller, one or more processing units (CPUs), a peripheral interface, an RF circuit, an audio circuit, a speaker, a microphone, an input/output (I/O) subsystem, other inputs can control the client, and an external port. The client may comprise one or more optical sensors which may communicate via one or more communication buses or signal wires.

It should be appreciated that the client 302 is only an example of a portable multi-functional device, and the client may have more or less parts than those shown, may combine two or more parts, or may have different configurations or arrangements of parts.

The memory may comprise a high speed random access memory, and may further comprise a nonvolatile memory such as one or more magnetic disk memory devices, flash memory devices or other nonvolatile memories. Access to the memory by other parts of the client such as CPU and a peripheral interface is controlled by a memory controller.

The peripheral interface couples the client's input and output peripheral to the CPU and the memory. One or more processors run or execute various software programs and/or instruction sets stored in the memory to implement various functions of the client and process data.

In some embodiments, the peripheral interface, CPU and memory controller may be implemented on a single chip such as a chip. In some other embodiments, they may be implemented on discrete chips.

An RF (radio frequency) circuit receives and sends an RF signal. The RF circuit converts an electrical signal to an electromagnetic signal/converts an electromagnetic signal to an electrical signal, and communicates with a communication network and other communication devices via the electromagnetic signal. The RF circuit may include a known circuit for executing these functions and it includes but not limited to an antenna system, an RF transceiver, one or more amplifiers, a tuner, one or more oscillators, a digital signal processor, a CODEC chipset, a subscriber identity module (SIM) and a memory.

An audio circuit, a speaker and a microphone provide an audio interface between the user and the client. The audio circuit receives audio data from a peripheral interface, converts the audio data to an electrical signal, and sends the electrical signal to the speaker. The speaker converts the electrical signal to audible acoustic waves. The audio circuit also receives the electrical signal converted by the microphone from acoustic waves. The audio circuit converts the electrical signal to audio data and sends the audio data to the peripheral interface for processing. Audio data may be searched from the memory and/or RF circuit through the peripheral interface and/or be sent to the memory and/or RF circuit.

An I/O subsystem couples an input/output peripheral on the client to the peripheral interface. The I/O subsystem may comprise a display controller and one or more input controllers for other input or controlling clients. The one or more input controllers receives/sends the electrical signal from/to other input or controlling clients. Other input or controlling clients may comprise a physical button, dialing keys, a slide switch, a joystick, a clicking roller and the like. In some alternative embodiments, an input controller may be coupled to any one of the following: keyboard, infrared port, USB port, and an indication device such as a mouse.

A touch-sensitive touch screen provides an input interface and an output interface between the client and the user. The display controller receives and/or sends the electrical signal from/to the touch screen. The touch screen displays visual output to the user. The visual output may comprise graph, text, icon, video and any combination thereof (collectively called "graphs").

The touch screen has a touch-sensitive surface, a sensor or a sensor group for receiving input from the user based on tactile sense and/or tactile touch. The touch screen and the display controller detect contact on the touch screen, and convert the detected touch to an interaction with a user interface object displayed on the touch screen. In an exemplary embodiment, a contact point between the touch screen and the user corresponds to the user's finger. Other embodiments may also employ other display technologies.

Steps similar to the method for recognizing the network behavior of the program in other embodiments will not be detailed here.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the searching apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 5:
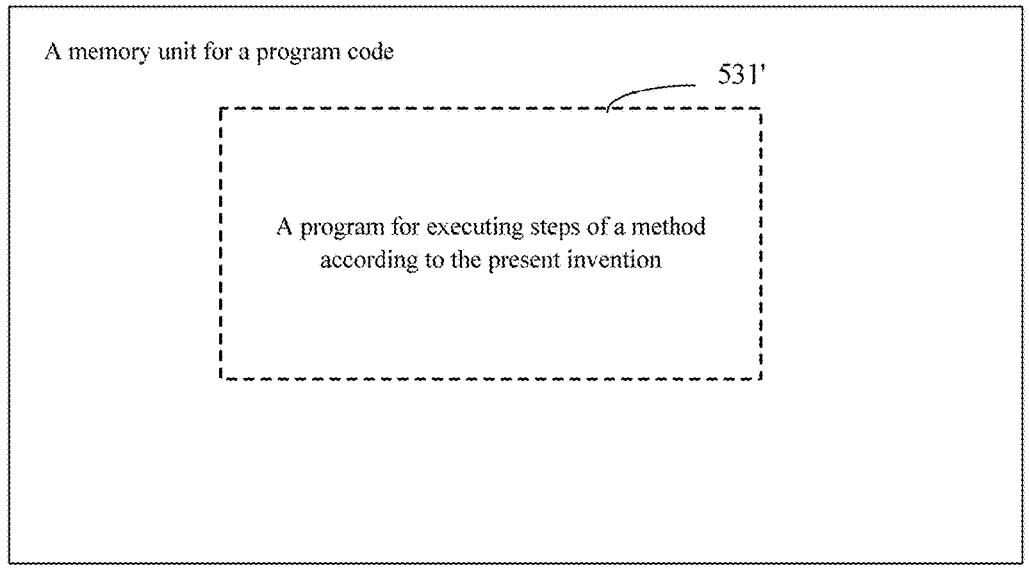
FIG. 5 schematically shows a memory unit for retaining or carrying program codes for performing the method according to the present invention.

For example, FIG. 5 illustrates a server for implementing the method for recognizing the network behavior of the program according to embodiments of the present invention, for example an application server. The application server conventionally comprises a processor 510 and a computer program product or computer-readable medium in the form of a memory 520. The memory 520 may be a flash memory, EEPROM (Electrically Erasable Programmable Read-Only Memory), EPROM, hard disk or ROM-like electronic memory. The memory 520 has a storage space 530 for a program code 531 for executing any step of the above method. For example, the storage space 530 for the program code may comprise program codes 531 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 5. The memory unit may have a storage section, a storage space or the like arranged in a similar way to the memory 520 in the server of FIG. 5. The program code may for example be compressed in a suitable form. Usually, the memory unit includes a computer-readable code 531', namely, a code readable by a processor such as 510. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

The algorithm and display provided herein are not intrinsically related to any specific computer, virtual system or other devices. Various general systems may also be used together with a teaching based on this. According to the above depictions, structures required for constructing such type of systems are obvious. Besides, the present application is not with respect to any specific programming language. It shall be understood that various programming languages may be used to implement the content of the present invention described here, and the above depictions for specific language are intended to reveal preferred embodiments of the present invention.

The description as provided here describes a lot of specific details. However, it is appreciated that embodiments of the present invention may be implemented in the absence of these specific details. Some embodiments do not specify detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

The invention claimed is:

1. A method for recognizing a network behavior of a program, the method comprising:
   during the program's access to a network, acquiring, by a processor, application layer data in a current network behavior of the program;
   determining, by the processor, whether the application layer data includes an unknown protocol;
   if protocols in the application layer data are all known protocols, identifying, by the processor, the current network behavior of the program as a network behavior of a recognizable program;
   acquiring, by the processor, feature information in the application layer data in the network behavior of the recognizable program, the feature information comprising partial codes in the application layer data, a data packet in the application layer data, or a segment of data in the data packet in the application layer data;
   sending, by the processor, the feature information to a cloud server, the cloud server determining whether the network behavior of the recognizable program is the network behavior of a malicious program according to the feature information, and returning a result; and
   if the application layer data includes the unknown protocol, identifying, by the processor, the current network behavior of the program as a network behavior of a suspicious program.

2. The method according to claim 1, wherein determining whether the application layer data includes the unknown protocol comprises:
   determining whether the application layer data includes the unknown protocol according to formats of the known protocols, determining that protocols in the application layer data are all the known protocols if the protocols in the application layer data can all be recognized, and determining that the application layer data comprises the unknown protocol if at least part of protocols in the application layer data cannot be recognized.

3. The method according to claim 2, wherein the known protocols at least comprise at least one of: hypertext transport protocol, domain name system protocol, simple mail transfer protocol, file transfer protocol, simple network management protocol, and post office protocol three.

4. The method according to claim 1, wherein, the method further comprises:
   sending risk prompt information and/or intercepting the current network behavior of the recognizable program if the result indicates that the network behavior of the recognizable program is the network behavior of the malicious program; and
   identifying the current network behavior of the recognizable program as a normal network behavior if the result indicates that the network behavior of the recognizable program is not the network behavior of the malicious program.

5. The method according to claim 1, wherein the method further comprises:
   acquiring the feature information in the application layer data in the network behavior of the recognizable program, the feature information comprising the partial codes in the application layer data, the data packet in the application layer data, or the segment of data in the data packet in the application layer data; and
   determining whether the network behavior of the recognizable program is the network behavior of the malicious program according to the feature information.

6. The method according to claim 1, wherein, the method further comprises:
   determining whether the network behavior of the suspicious program is the network behavior of the malicious program;
   sending risk prompt information and/or intercepting the current network behavior of the suspicious program if the network behavior is the network behavior of the malicious program; and
   sending risk prompt information if the network behavior is not the network behavior of the malicious program.

7. The method according to claim 6, wherein the method further comprises:
   acquiring the feature information in the application layer data in the network behavior of the suspicious program, the feature information comprising the partial codes in the application layer data, the data packet in the application layer data, or the segment of data in the data packet in the application layer data; and
   determining whether the network behavior of the suspicious program is the network behavior of the malicious program according to the feature information.

8. The method according to claim 6, wherein the method further comprises:
   acquiring the feature information in the application layer data in the network behavior of the suspicious program, the feature information comprising the partial codes in the application layer data, the data packet in the application layer data, or the segment of data in the data packet in the application layer data; and
   sending the feature information to the cloud server, the cloud server determining whether the network behavior of the suspicious program is the network behavior of the malicious program according to the feature information, and returning the result.

9. A device for recognizing a network behavior of a program, the device comprising at least one processor to:
   acquire application layer data in a current network behavior of the program during the program's access to a network;
   determine whether the application layer data includes an unknown protocol;
   identify the current network behavior of the program as a network behavior of a recognizable program when protocols in the application layer data are all known protocols;
   identify the current network behavior of the program as a network behavior of a suspicious program if the application layer data includes the unknown protocol;
   acquire feature information in the application layer data in the network behavior of the recognizable program, the feature information comprising partial codes in the application layer data, a data packet in the application layer data, or a segment of data in the data packet in the application layer data; and
   send the feature information to a cloud server, determine whether the network behavior of the recognizable program is the network behavior of a malicious program by the cloud server according to the feature information, and receive a result returned by the cloud server.

10. The device according to claim 9, the at least one processor further to determine whether the application layer data includes an unknown protocol according to formats of known protocols.

11. The device according to claim 10, wherein the known protocols at least comprise at least one of: hypertext transport protocol, domain name system protocol, simple mail transfer protocol, file transfer protocol, simple network management protocol, and post office protocol three.

12. The device according to claim 9, the at least one processor further to:
   send risk prompt information and/or intercept the current network behavior of the recognizable program when determining that the network behavior of the recognizable program is the network behavior of the malicious program; and
   identify the current network behavior of the recognizable program as a normal network behavior when determining that the network behavior of the recognizable program is not the network behavior of the malicious program.

13. The device according to claim 12, the at least one processor further to:
   acquire the feature information in the application layer data in the network behavior of the recognizable program, the feature information comprising the partial codes in the application layer data, the data packet in the application layer data, or the segment of data in the data packet in the application layer data; and
   determine whether the network behavior of the recognizable program is the network behavior of the malicious program according to the feature information.

14. The device according to claim 9, the at least one processor further to:
   determine whether the network behavior of the suspicious program is the network behavior of the malicious program;
   send risk prompt information and/or intercept the current network behavior of the suspicious program when determining that the network behavior of the suspicious program is the network behavior of the malicious program; and send risk prompt information when determining that the network behavior of the suspicious program is not the network behavior of the malicious program.

15. The device according to claim 14, the at least one processor further to:

acquire the feature information in the application layer data in the network behavior of the recognizable program, the feature information comprising the partial codes in the application layer data, the data packet in the application layer data, or the segment of data in the data packet in the application layer data; and determine whether the network behavior of the recognizable program is the network behavior of the malicious program according to the feature information.

16. The device according to claim 14, the at least one processor further to:

acquire the feature information in the application layer data in the network behavior of the suspicious program, the feature information comprising the partial codes in the application layer data, the data packet in the application layer data, or the segment of data in the data packet in the application layer data;

send the feature information to the cloud server, determining whether the network behavior of the suspicious program is the network behavior of the malicious program by the cloud server according to the feature information; and receive the result returned by the cloud server.

17. A non-transitory computer readable medium having instructions stored thereon that, when executed by at least one processor, cause the at least one processor to perform operations for recognizing a network behavior of a program, the operations comprising:

during the program's access to a network, acquiring application layer data in a current network behavior of the program;

determining whether the application layer data includes an unknown protocol;

if protocols in the application layer data are all known protocols, identifying the current network behavior of the program as a network behavior of a recognizable program;

acquiring feature information in the application layer data in the network behavior of the recognizable program, the feature information comprising partial codes in the application layer data, a data packet in the application layer data, or a segment of data in the data packet in the application layer data;

sending the feature information to a cloud server, the cloud server determining whether the network behavior of the recognizable program is the network behavior of a malicious program according to the feature information, and returning a result; and if the application layer data includes the unknown protocol, identifying the current network behavior of the program as a network behavior of a suspicious program.

* * * * *